(12) United States Patent
Narayanan et al.

(10) Patent No.: US 7,639,605 B2
(45) Date of Patent: Dec. 29, 2009

(54) SYSTEM AND METHOD FOR DETECTING AND RECOVERING FROM VIRTUAL SWITCH LINK FAILURES

(75) Inventors: Manoj T. Narayanan, San Jose, CA (US); Hemant K. Hebbar, Santa Clara, CA (US); Vinayakumar V. Parameswarannair, San Jose, CA (US); Eden Tan, Campbell, CA (US); Michael R. Smith, San Jose, CA (US); Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 520 days.

(21) Appl. No.: 11/350,231

(22) Filed: Feb. 8, 2006

(65) Prior Publication Data

US 2007/0183313 A1    Aug. 9, 2007

(51) Int. Cl.
 *H04J 3/14* (2006.01)
(52) U.S. Cl. .................................. 370/219; 370/220
(58) Field of Classification Search ................. 370/216, 370/217, 218, 219, 220; 714/1, 2, 3, 4, 100
See application file for complete search history.

(56) References Cited

U.S. PATENT DOCUMENTS

| | | | |
|---|---|---|---|
| 5,959,968 A | 9/1999 | Chin et al. | |
| 6,298,061 B1 * | 10/2001 | Chin et al. | 370/400 |
| 6,434,612 B1 | 8/2002 | Hughes et al. | |
| 6,473,424 B1 | 10/2002 | DeJager et al. | |
| 6,567,403 B1 | 5/2003 | Congdon et al. | |
| 6,628,649 B1 | 9/2003 | Raj et al. | |
| 6,826,196 B1 | 11/2004 | Lawrence | |
| 6,853,623 B2 | 2/2005 | Nederveen et al. | |
| 7,272,309 B1 * | 9/2007 | Tamil et al. | 398/47 |
| 2005/0044262 A1 | 2/2005 | Luo | |
| 2005/0063395 A1 * | 3/2005 | Smith et al. | 370/399 |
| 2005/0066216 A1 | 3/2005 | Hebbar et al. | |

(Continued)

OTHER PUBLICATIONS

IEEE Std. 802.3™-2002, IEEE Standard for Information Technology—Telecommunications and Information Exchange Between Systems—Local and Metropolitan Area Networks—Specific Requirements; Part 3: Carrier Sense Multiple Access with Collision Detection (CSMA/CD) Access Method and Physical Layer Specifications, Section 43, Link Aggregation, Mar. 8, 2002, pp. 282-345, New York.

(Continued)

*Primary Examiner*—William Trost, IV
*Assistant Examiner*—Siming Liu
(74) *Attorney, Agent, or Firm*—Cesari and McKenna, LLP (57) ABSTRACT

A system and method detects and responds to failures occurring in a virtual switch. The virtual switch is formed from two or more physical switches interconnected by a Virtual Switch Link (VSL). One physical switch is elected the Master, and it executes a link aggregation protocol for the virtual switch. If the VSL fails, one of the other physical switches assumes that it should become the Master for the virtual switch, and it begins executing the link aggregation protocol. By adding information unique to the physical switches in the control packets of the link aggregation protocol, remote switches can identify when the VSL fails, and report this condition to the original Master. In response, the original Master or the new Master takes corrective action.

26 Claims, 9 Drawing Sheets

U.S. PATENT DOCUMENTS

2005/0190757 A1     9/2005   Sajassi
2005/0276215 A1*   12/2005   Kitani et al.   ............... 370/217
2006/0039384 A1*    2/2006   Dontu et al.    ............... 370/400
2007/0047436 A1*    3/2007   Arai et al.     ............... 370/219

OTHER PUBLICATIONS

Cisco Virtual Switch Architecture, Cisco Systems, Inc., Technology Brief, 2002, pp. 1-6.

Chapter 5: Configuring EtherChannel, Catalyst 6000 Family Software Configuration Guide, pp. 5-1 to 5-8, YEAR???????.

PCT Notification of Transmittal of the International Search Report and the Written Opinion of the International Searching Authority, or the Declaration; International Application No. PCT/US07/01091, International Filing Date Jan. 16, 2007; Date of Mailing Oct. 19, 2007, 11 pages.

* cited by examiner

SYSTEM AND METHOD FOR DETECTING AND RECOVERING FROM VIRTUAL SWITCH LINK FAILURES

BACKGROUND OF THE INVENTION

1. Field of the Invention

The present invention relates generally to computer networks, and more specifically, to a method and apparatus for detecting and recovering from link failures.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) messages over the communications media. A common type of computer network is a local area network ("LAN") which typically refers to a privately owned network within a single building or campus. LANs typically employ a data communication protocol (LAN standard), such as Ethernet, or a wireless protocol, that defines the functions performed by data link and physical layers of a communications architecture (i.e., a protocol stack).

One or more intermediate network devices are often used to couple LANs together and allow the corresponding entities to exchange information. For example, a bridge or switch may be used to provide a "switching" function between two or more LANs or end stations. Typically, the bridge or switch is a computer and includes a plurality of ports that are coupled to LANs and end stations, such as servers and hosts, as well as to other bridges and/or routers. Ports used to couple bridges to each other are generally referred to as a trunk ports, whereas ports used to couple bridges to LANs and end stations are generally referred to as access ports. The bridging function includes receiving data from a sending entity at a source port, and transferring that data to at least one destination port for forwarding to one or more receiving entities.

In a typical network design, a plurality of access switches are disposed in a wiring closet. The access switches are coupled to the workstations and servers of an enterprise or organization. The access switches from several wiring closets are then connected by uplinks to a plurality of distribution switches. The distribution switches, in turn, are connected to core switches so that the workstations and servers associated with the first wiring closet can access information and services available in other parts of the enterprise or organization.

Each switch of a computer network generally requires some configuration, which can be time-consuming and error prone. Thus, it is desirable to simplify the network design, and reduce the amount of network configuration that must be performed.

SUMMARY OF THE INVENTION

Briefly, the invention relates to a system and method for detecting and responding to failures occurring in a virtual switch. A virtual switch is a logical representation of a plurality of physical switches as a single switch. The virtual switch is formed by interconnecting the physical switches via one or more Virtual Switch Links (VSLs). The physical switches communicate across the VSLs in order to elect one of them to be the active part of the virtual switch. The active part, also referred to as the Master Chassis, executes the bridging and routing protocols for the entire virtual switch. The non-elected parts of the virtual switch operate as standby parts, also referred to as Slave Chassis. In an illustrative embodiment, the virtual switch is disposed within a computer network, and interconnects a plurality of access switches with one or more core switches. Each of the physical switches forming the virtual switch includes at least one supervisor module that, in turn, has a protocol engine and a virtual switch engine. The protocol engine in cooperation with the access switches, execute a network protocol, such as the link aggregation protocol, by exchanging control packets or Protocol Data Units (PDUs). By running the link aggregation protocol, the virtual switch determines whether it is coupled to any given access switch by more than one link. If so, the multiple links connecting the virtual switch to the given access switch are aggregated together.

In accordance with a preferred embodiment of the present invention, the PDUs of the link aggregation protocol are modified to carry information regarding both the virtual switch and which physical switch is the active part of the virtual switch. Specifically, each PDU sourced by the virtual switch is configured to carry a virtual switch identifier (ID) and an active part ID. This information, i.e., virtual switch ID and active part ID, are preferably stored by the access switches receiving the PDUs, and reflected back to the virtual switch in PDUs that are sourced by the access switches.

If the standby part of virtual switch stops receiving communications from the active part across the VSLs, indicating either that the active part has failed, or that the VSLs have gone down, the standby part of the virtual switch presumes that it should become the active part of the virtual switch. In response, the former standby part of the virtual switch generates PDUs and loads its own ID into the active part ID of these PDUs. The former standby part then transmits these PDUs from its ports, thereby signaling to the access switches that the previously standby part of the virtual switch is now the active part. Access switches receiving such information will conclude that former standby is now the active part of the virtual switch. In response, the access switches include this new information in the PDUs that they send back to the virtual switch.

If the failure at the virtual switch is a failure of the VSLs and the originally active part of the virtual switch continues to function, then it will receive PDUs from the access switches that carry information indicating that the former standby part of the virtual switch is now the active part. The originally active part of the virtual switch will thus conclude that the VSLs have failed. In response, the originally active part will take corrective action. Preferably, the originally active part will relinquish its role as the active part of the virtual switch, and enter a recovery mode. While in the recovery mode, the ports of the originally active part, other than the ports of the VSLs, are shut-down. Thereafter, if the VSLs recover, the originally active part of the virtual switch becomes the standby part of the virtual switch.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
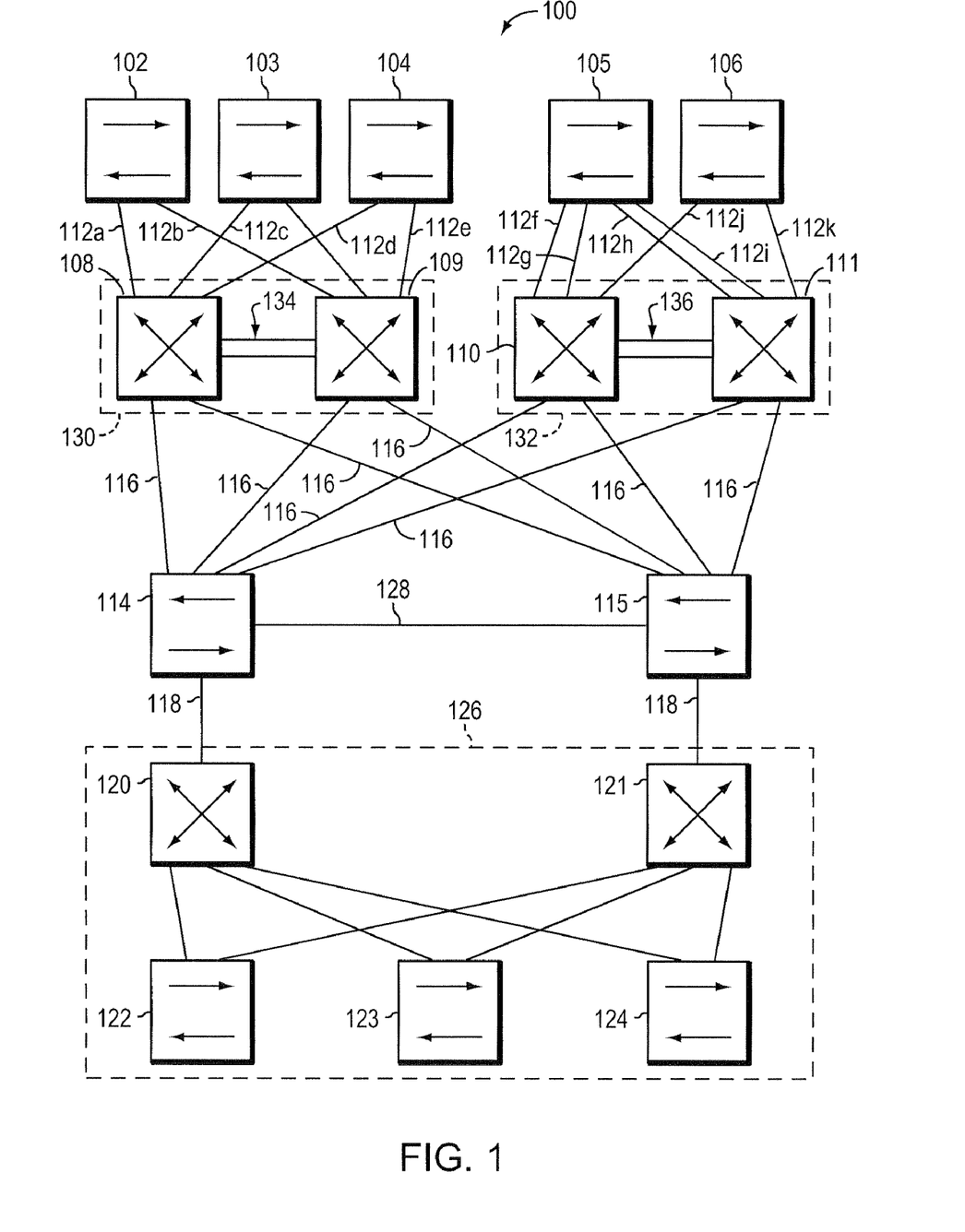
FIG. 1 is a highly schematic, partial block diagram of a computer network.

FIG. 1 is a highly schematic illustration of a computer network 100. The network 100 includes a plurality of access switches 102-106 that are coupled to four distribution switches 108-111 by corresponding uplinks 112*a-k*. The distribution switches 108-111, in turn, are coupled to a pair of core switches 114 and 115 by a plurality of links 116. The core switches 114 and 115 are coupled via trunks 118 to a group of distribution switches 120 and 121, and access switches 122-124 that may represent a data center 126. The two core switches 114 and 115 may be interconnected by a point-to-point link 128. Access switches 102-104 and 105-106 are typically disposed in respective wiring closets, and are each coupled to a plurality of local area networks (LANs) and end stations (not shown). The access switches 122-124 of the data center 126 are similarly coupled to data storage systems and/or other devices (not shown). The configuration of the network 100 allows the LANs and end stations coupled to access switches 102-106 to communicate with each other and to access the information and services represented by the data center 126.

It should be understood that the network 100 of FIG. 1 is meant for illustrative purposes only, and that the present invention will operate with other networks having possibly far more complex topologies.

In accordance with the present invention, distribution switches 108 and 109 are logically organized together to form a single virtual switch 130. Similarly, distribution switches 110 and 111 are logically organized together to form another virtual switch 132, as indicated by the dashed lines. In particular, distribution switches 108 and 109 are preferably interconnected by one or more Virtual Switch Links (VSLs) 134. Likewise, distribution switches 110 and 111 are interconnected by one or more VSLs 136. The VSLs 134 and 136 carry control and data traffic between the respective peer physical switches or chassis of the respective virtual switch. By forming a virtual switch 130, distribution switches 108 and 109 appear to access switches 102-104 as a single, large distribution switch. And, distribution switches 110 and 111 appear to access switches 105 and 106 as a single, large distribution switch. It should be understood that virtual switch 130 or 132 may be formed from more than two physical switches.

Figure 2:
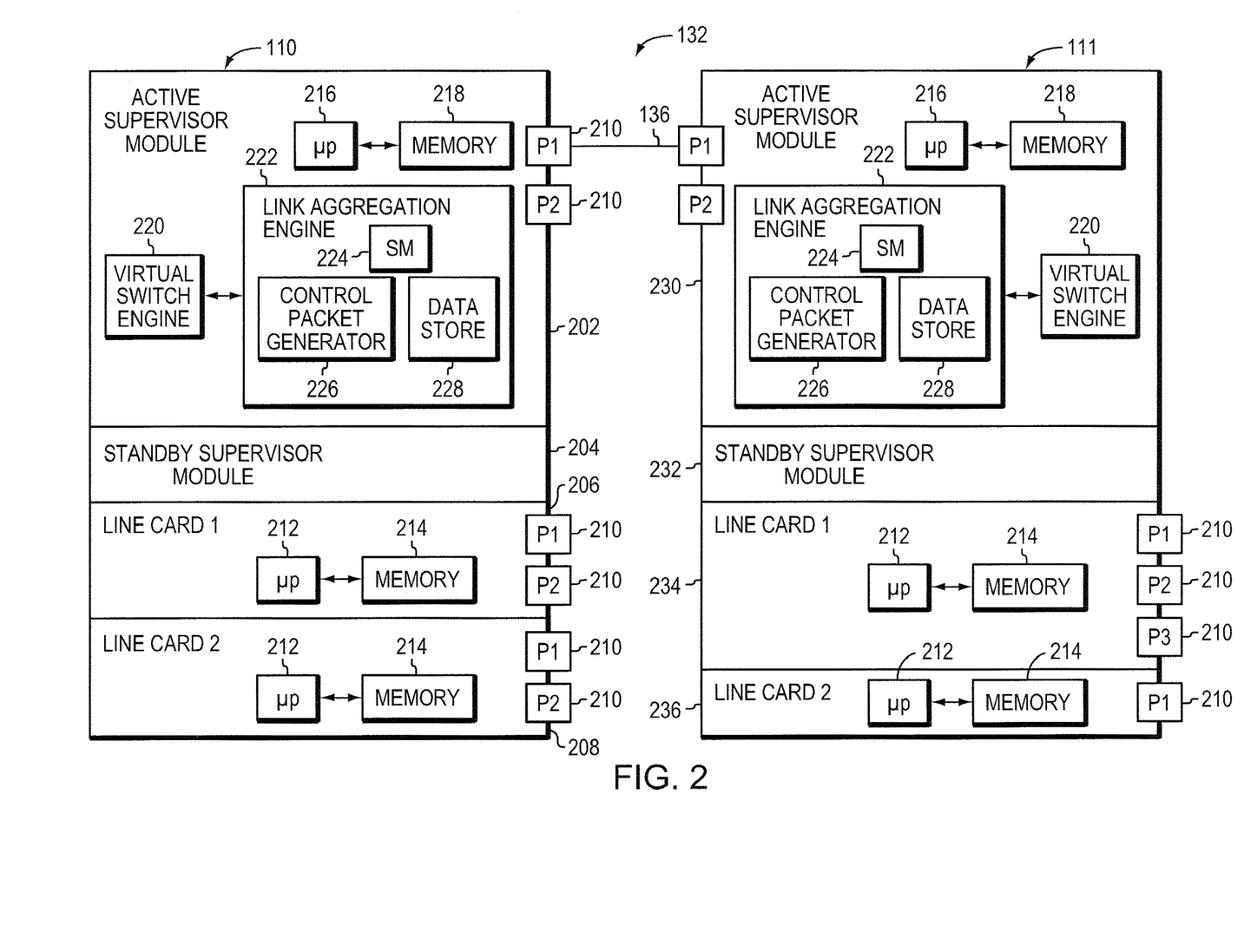
FIG. 2 is a highly schematic functional block diagram of a virtual switch.

FIG. 2 is a highly schematic, partial, functional block diagram of virtual switch 132. Distribution switch 110 preferably includes two supervisor modules: an active supervisor module 202 and a standby supervisor module 204. Distribution switch 110 further includes a plurality, e.g., two, line cards 206 and 208. Each line card 206 and 208 has a plurality of ports 210, and further includes a microprocessor (μp) 212 connected to a memory 214. The active supervisor 202 also has at least one microprocessor 216 connected to at least one memory 218. The active supervisor 202 further includes a virtual switch engine 220 and a protocol engine, such as link aggregation engine 222. In the illustrative embodiment, the active supervisor module 202 also has its own ports 210. The link aggregation engine 222 has a number of sub-components, including one or more state machines (SM) 224, a control packet generator 226 and a data store 228. Coupled to port P1 210 of the active supervisor module 202 is the VSL 136, which leads to the second distribution switch 111 of the virtual switch 132.

Distribution switch 111 also includes two supervisor modules, one of which is an active supervisor module 230 and the other of which is a standby supervisor module 232. Distribution switch 111 also has a plurality of, e.g., two, line cards 234 and 234 that have ports 210. Line cards 234 and 236 also have corresponding microprocessors 212 and memories 214. The active supervisor module 230 of distribution switch 111 also has a virtual switch engine 220, a link aggregation engine 222, a microprocessor 216, a memory 218, and a plurality of ports 210, one of which, i.e., port P1 is coupled to the VSL 136 and thus to distribution switch 110.

A suitable design for virtual switch 132 is disclosed in U.S. Patent Application Publication No. US2005/0063395A1 entitled Virtual Network Device, which is hereby incorporated by reference in its entirety. Those skilled in the art will recognize that distribution switches 110 and 111 will have additional components, such as forwarding engines, filtering databases, spanning tree protocol engines, etc. (not shown).

Suitable distribution switches for use with the present invention include the Catalyst 6000 series of switches from Cisco Systems, Inc. of San Jose, Calif.

Figure 3:
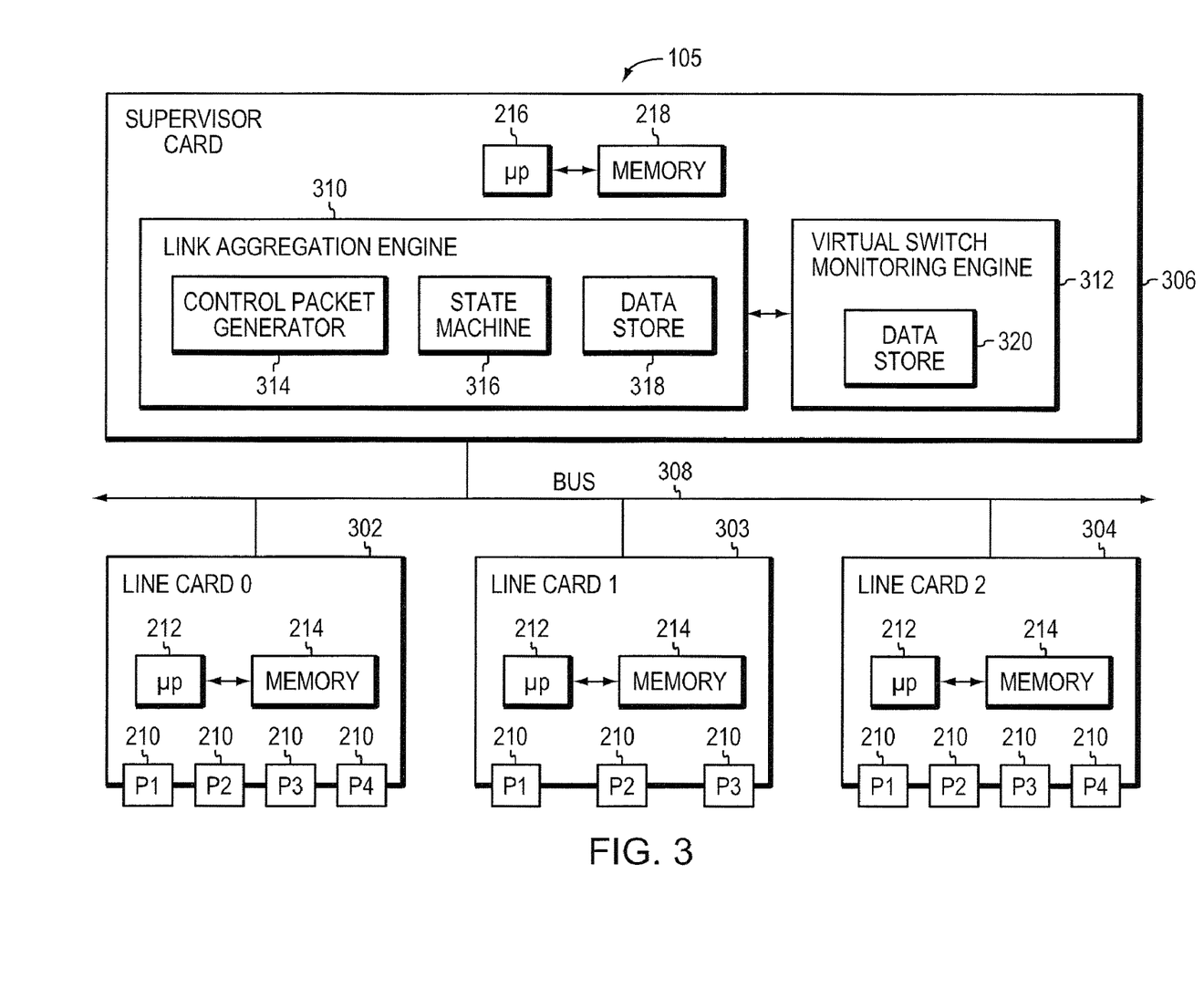
FIG. 3 is a highly schematic function block diagram of an access switch.

FIG. 3 is a highly schematic, function block diagram of an access switch, such as access switch 105, in accordance with the present invention. Switch 105 includes a plurality of line cards 303-304, and a supervisor card 306. Line cards 302-304 and supervisor card 306 are in communicating relationship with each other through a communication bus 308. Each line card 302-304 includes a microprocessor (μP) 212 and at least one memory 214. The supervisor card 306 also includes a μP 216 and a memory 218. In accordance with the present invention, supervisor card 306 further includes a protocol engine, such as link aggregation engine 310, and a virtual switch monitoring engine 312. The link aggregation engine 310 preferably includes a control packet generator 314, one or more state machines 316 and a data store 318. The virtual switch monitoring engine 312 preferably includes a data store 320.

In the illustrated embodiment, the line cards of the access and distribution switches represent transmitting and receiving circuitry, and may be formed from one or more network interface cards (NICs) that establish ports for the exchange of network messages.

Referring to FIGS. 2 and 3, it will be understood by those skilled in the art that the virtual switch engines 220, the virtual switch monitoring engine 312 and the link aggregation engines 222 and 310, may each comprise registers and combinational logic configured and arranged to produce sequential logic circuits. In the preferred embodiment, these components are software modules or libraries containing program instructions pertaining to the methods described herein, stored in a computer readable memory, such as memories 218, and executable by one or more processing elements, such microprocessors 216. Other computer readable media may also be used to store and execute these program instructions. Nonetheless, those skilled in the art will recognize that various combinations of software and hardware, including firmware, may be utilized to implement the present invention.

Figure 4A:
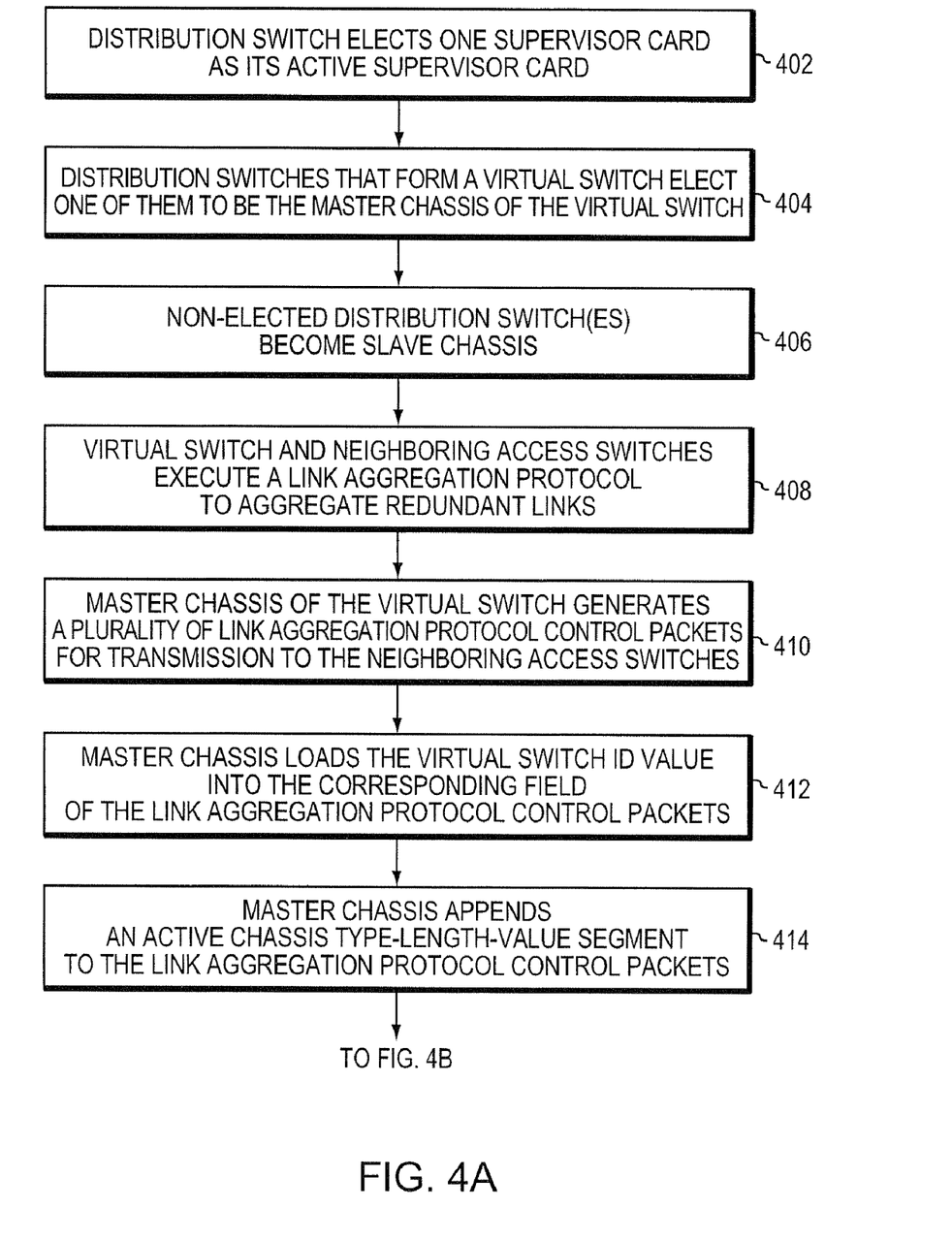
FIGS. 4A-D is a flow diagram in accordance with a preferred method of the present invention.

FIGS. 4A-D is a flow diagram of a preferred method in accordance with the present invention. First, each distribution switch that has more than one supervisor module elects one of them to be the active supervisor module for that distribution switch, as indicated at block 402 (FIG. 4A). If a distribution switch has only one supervisor module, then this step is ignored. The non-elected supervisor module(s) becomes the switch's standby supervisor module(s). Next, the distributions switches forming a virtual switch, such as switches 110 and 111, communicate with each other across the VSL 136 and elect one of them to be the active part of the virtual switch 132 also referred to as the Master Chassis, as indicated at block 404. Suppose, for example, that switches 110 and 111 elect distribution switch 110 to be the active part or Master Chassis of the virtual switch 132. The other distribution switch, i.e., switch 111, then becomes the standby part or Slave Chassis of the virtual switch 132, as indicated at block 406.

In the illustrative embodiment, forwarding decisions for virtual switch 132 are made by the active supervisor module of the Master Chassis, which may also be referred to as the Master Active Supervisor. For virtual switch 132, the Master Active Supervisor is active supervisor module 202. The Master Active Supervisor 202 also executes all of the bridging and routing protocols, such as the Spanning Tree Protocol, etc., run by the virtual switch 132. Accordingly, control packets, such as configuration Bridge Protocol Data Units (BPDUs), received at a line card, e.g., line card 234, of the Slave Chassis 111 are sent to the active supervisor module 202 of the Master Chassis 110 for processing. Similarly, control packets that are to be sent from the ports of the Slave Chassis 111 are preferably generated by the active supervisor module 202 of the Master Chassis 110 and sent to the line cards 234, 236 of the Slave Chassis 111 for transmission thereby.

It should be understood, however, that the active supervisor at each chassis, i.e., at the master and at the slave, runs certain protocols relating to the chassis' infrastructure, such as powering up the line cards, etc.

The virtual switch 132 and the access switches 105, 106 preferably execute a link aggregation protocol so that multiple links between a given access switch, e.g., switch 105 and the virtual switch 132 can be aggregated, as indicated at block 408. In the illustrative embodiment, the virtual switch 132 and the access switches 105, 106 run the Port Aggregation Protocol (PAgP) from Cisco Systems, Inc. of San Jose, Calif., and described in U.S. Pat. No. 5,959,968 entitled Port Aggregation Protocol, which is hereby incorporated by reference in its entirety. In particular, PAgP is run by the link aggregation engines 222 and 310 disposed at the virtual switch 132 and the access switches 105, 106, respectively. To execute PAgP, the virtual switch 132 and access switches 105, 106 exchange control messages referred to as PAgP Protocol Data Units (PDUs).

Figure 5:
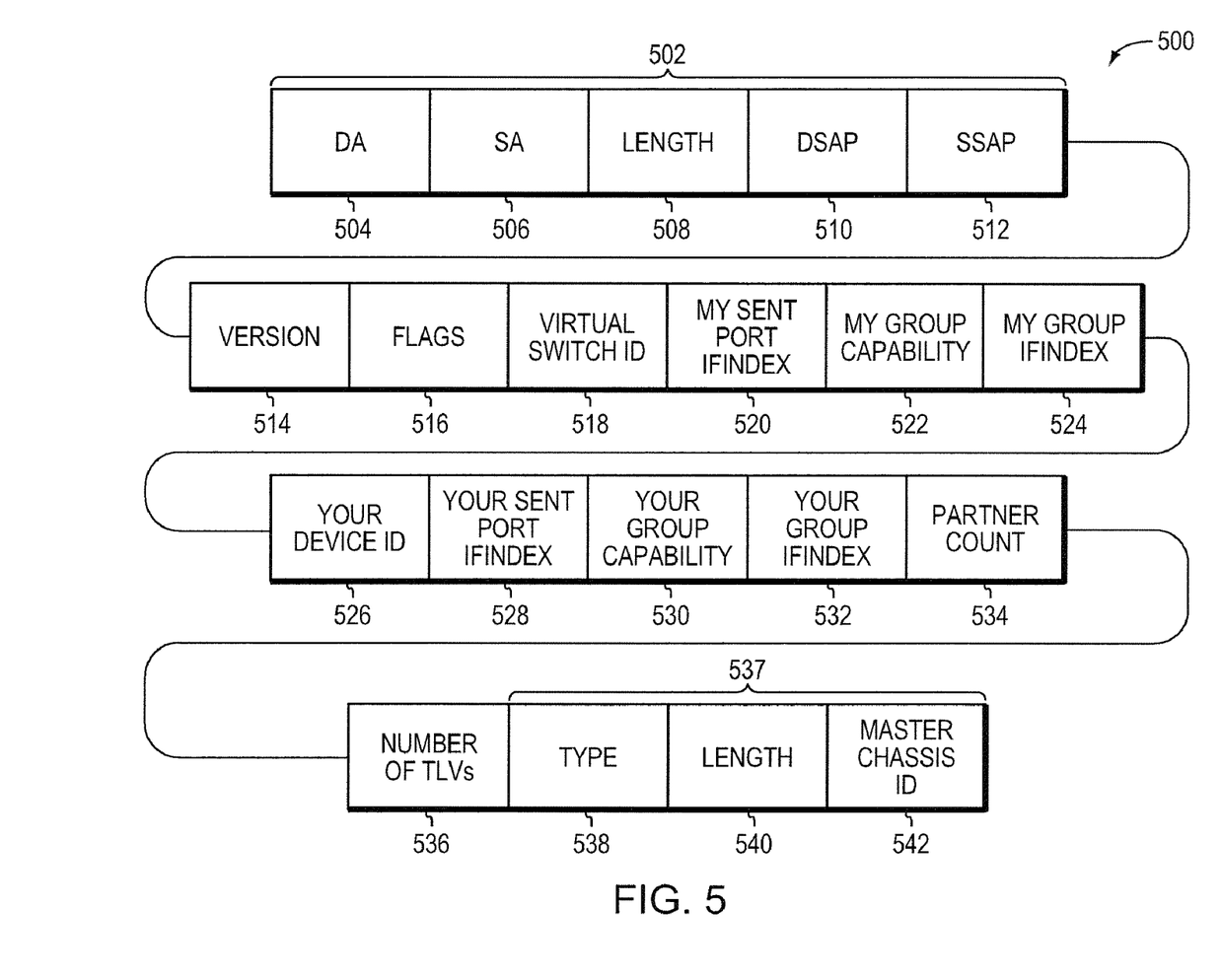
FIGS. 5 and 6 are highly schematic illustrations of control message formats in accordance with preferred embodiments of the present invention.

FIG. 5 is a highly schematic illustration of a PAgP PDU 500 in accordance with a preferred embodiment of the present invention. The PAgP PDU 500 includes a header 502, which is made up of a Destination Address (DA) field 504, a Source Address (SA) field 506, a length field 508, a Destination Service Access Point (DSAP) field 510, and a Source Service Access Point (SSAP) 512. Following the header 502 are a version field 514 and a flags field 516. Normally, the flags field 516 is followed by a "my device ID" field. However, in accordance with a preferred embodiment of the present invention, the "my device ID" field is replaced with a virtual switch ID field 518. The PAgP PDU 500 further includes a My Set Port Ifindex field 520, a My Group Capability field 522, a My Group Ifindex field 524, a Your Device ID field 526, a Your Sent Port Ifindex field 528, a Your Group Capability field 530, a Your Group Ifindex field 532, and a Partner Count field 534. The PAgP PDU 500 may also include one or more sets of type-length-value (TLV) fields. In particular, the PAgP PDU 500 includes a Number Of TLVs field 536 followed by one or more sets of type 538, length 540 and value 542 fields.

The control packet generator 226 at the Master Active Supervisor 202 preferably generates one or more PAgP PDUs 500 for transmission from each port of the virtual switch 132, as indicated at block 410. That is, the control packet generator 226 generates PAgP PDUs 500 for transmission from the ports 210 at the Master Chassis 110 as well as from the ports of the Slave Chassis 111. The fields of the header 502 are preferably loaded in a conventional manner. Generator 226 preferably utilizes a new version value in version field 514 to indicate that the PAgP PDU 500 is a new version. The flags field 516 is loaded in a conventional manner. In the Virtual Switch ID field 518, the generator 226 preferably places a unique ID that has been assigned to the virtual switch 132, as indicated at block 412. In particular, a network administrator preferably configures each physical switch of a given virtual switch with a single virtual switch ID that is unique within the network 100. The same virtual switch ID is thus shared by all of the physical switches of a given virtual switch, and each physical switch that forms the given virtual switch preferably stores this same ID value, e.g., in its respective memory 218 and/or in the data store 228 of the link aggregation engine 222. Fields 520, 522 and 524 are loaded in a conventional manner depending on the port from which the PAgP PDU 500 is to be sent.

In particular, the My Sent Port Ifindex field 520 is loaded with the interface Management Information Base (MIB) ifindex assigned to the port from which the PAgP PDU 500 will be sent. The My Group Capability field 522 is loaded with the value configured for the respective port. This is a user-configurable value for controlling operation of PAgP. A given physical port can only be aggregated with another physical port whose group capability value is the same as the first port. Group capability values are preferably assigned through network administrator action. The My Group Ifindex field 524 is loaded with the interface MIB ifindex assigned to the aggregated port (agport) to which the respective physical port is attached. If the physical port is not currently attached to any agport, then field 524 is set to null, e.g., loaded with a zero value. Assuming no PAgP PDUs 500 have yet been received on the port from which the PAgP PDU that is currently being constructed by generator 226 is to be sent, then fields 526-532 are set to null. The partner count field 534 is loaded with the number of other devices known to be sending PAgP PDUs onto the port from which the current PAgP PDU is to be sent, which in this example is zero.

Figure 4B:
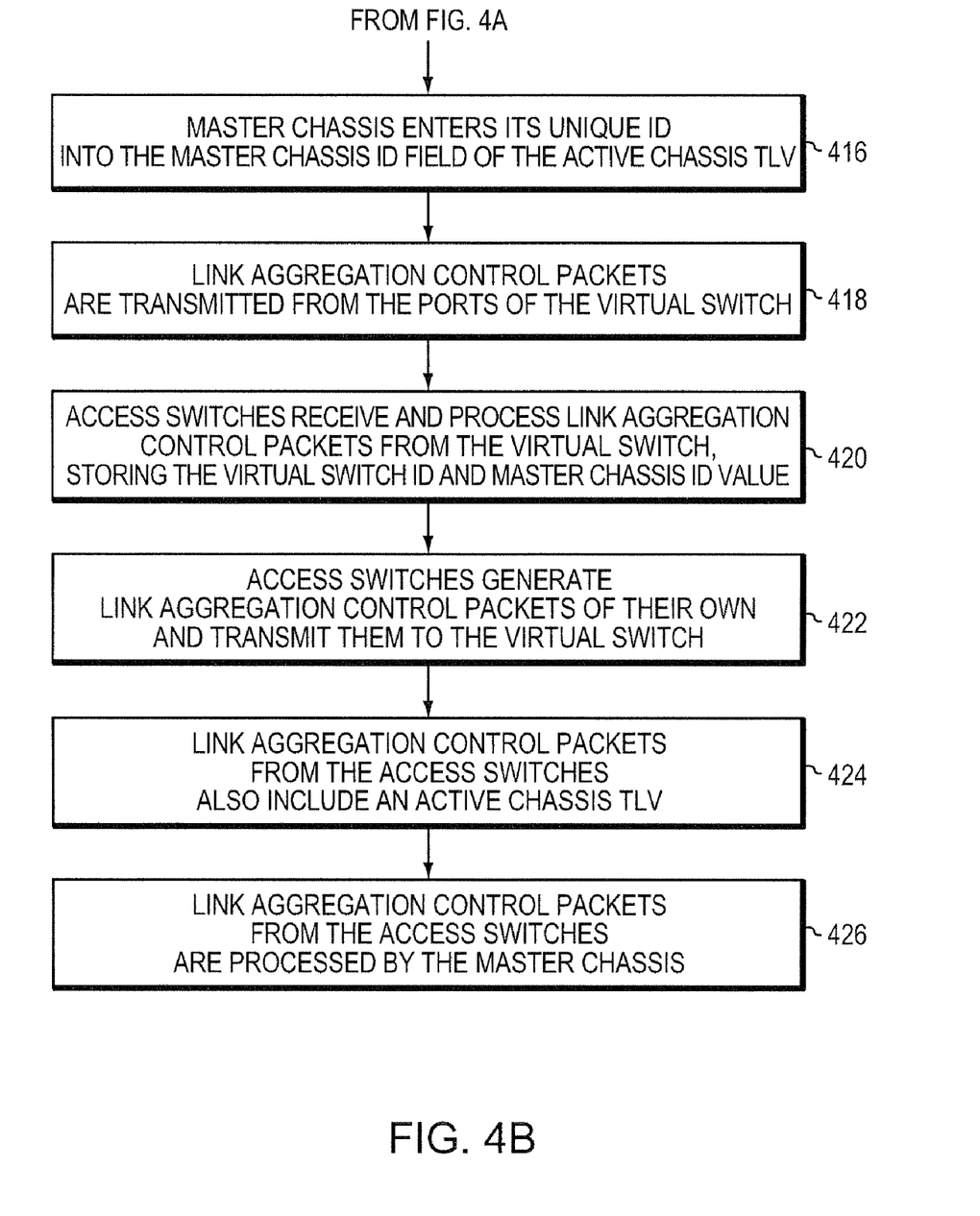

In accordance with the present invention, generator 226 appends a new, Active Chassis TLV 537 to the PAgP PDU 500, as indicated at block 414. Accordingly, the Number Of TLVs field 536 is set to at least the value of one. The type field 538 of the Active Chassis TLV 537 is preferably set to a selected value that will identify the TLV to other switches as an Active Chassis TLV. The length field 540 specifies the length of the Active Chassis TLV 537. In accordance with the preferred embodiment of the invention, each physical switch making up a given virtual switch is assigned its own unique ID. That is, distribution switch 110 and distribution switch 111 each have their own unique IDs. Because switch 110 has been elected as the Master or Active part of the Virtual Switch 132, generator 226 places the ID for distribution switch 110 into the Master Chassis ID field 542, as indicated at block 416 (FIG. 4B).

The PAgP PDU 500 created by generator 226 is then passed to the respective port and transmitted from the virtual switch 132, as indicated at block 418. Suppose the PAgP PDU 500 is to be sent from a port at the Slave Chassis 111. Then, the PAgP PDU 500 is passed across the VSL 136 to the Slave Chassis 111 from where it is transmitted from the respective port. The PAgP PDU 500 is received by access switch 105, and passed to its supervisor card 306 for processing by the link aggregation engine 310. Engine 310 preferably recovers the virtual switch ID value from field 518, and the Master Chassis ID value from field 542 of the received PAgP PDU 500 and stores these values, e.g., in memory 218 and/or data store 318, as indicated at block 420.

The control packet generator 314 of engine 310 also creates a PAgP PDU for transmission to the virtual switch 132 from the same port 210 of the access switch 105 on which the PAgP PDU 500 from the virtual switch 132 was received, as indicated at block 422. The PAgP PDU created by generator 314 is similar in format to the received PAgP PDU 500. There are, however, some differences. For example, field 518 is loaded with a unique device ID assigned to the access switch 105. Furthermore, fields 526-532 are loaded with the values contained in fields 518-524 of the received PAgP PDU 500. That is, the virtual switch ID value from field 518 of the received PAgP PDU 500 is entered into the Your Device ID field 526 of the PAgP PDU 500 being sent back to the virtual switch 132. Fields 520-524 are loaded based on information with which access switch 105 has been configured. The PAgP PDU sent from access switch 105 also includes an Active Chassis TLV 537, as indicated at block 424. The Master Chassis ID field of this Active Chassis TLV 537 is loaded with the same value as in the received PAgP PDU 500. In other words, the Master Chassis ID value is reflected back to the virtual switch 132 by the access switch 105.

This PAgP PDU from access switch 105 is received by the virtual switch 132 and passed to the link aggregation engine 222 at the Master Active Supervisor 202 for processing, as indicated at block 426. The virtual switch 132 similarly sends other PAgP PDUs 500 from its other ports coupled to the access switches 105 and 106, which process those received PAgP PDUs 500 and respond to the virtual switch 105 with PAgP PDUs of their own. By virtue of the exchange of PAgP PDUs, the virtual switch 132 and the access switch 105 discover that they are interconnected by four links 112*f-i*. These four links 112*f-i* are preferably aggregated together to form a single, logical link or channel. Similarly, the two links 112*j* and 112*k* interconnecting the virtual switch 132 and the access switch 106 are preferably aggregated together to form another single, logical link or channel.

Once multiple uplinks have been aggregated into a channel, data traffic can be distributed among the uplinks to provide load balancing and improve network performance. A suitable load-balancing technique is described in U.S. Pat. No. 6,473,424 entitled Port Aggregation Load Balancing, which is hereby incorporated by reference in its entirety.

Figure 4C:
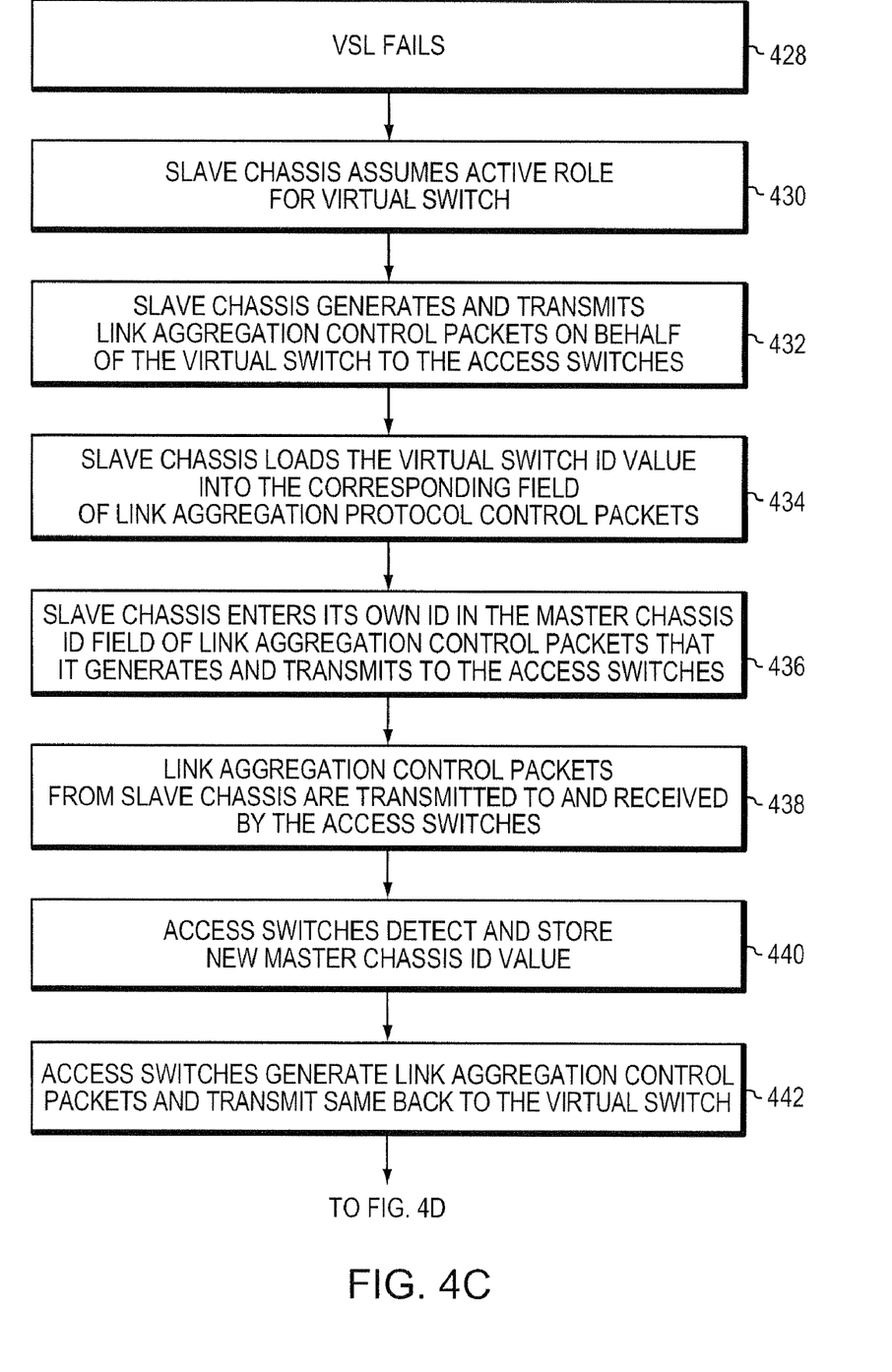

Suppose that the VSL 136 of virtual switch 132 fails, thereby cutting off communication between the two distribution switches 110 and 111 that make up virtual switch 132, as indicated at block 428. As a result, the Active Chassis stops receiving communications from the Slave Chassis 111, and the Slave Chassis 111 stops receiving communications from the Active Chassis 110. The Slave Chassis 111 cannot tell whether this communication outage is due to some failure of the Active Chassis, or to a failure of the VSL 136. In any event, the Slave Chassis 111 is preferably configured to respond by taking over the active role for the virtual switch 132, as indicated at block 430. In particular, the Slave Active Supervisor 230 initializes, and begins running the bridging and routing protocols of the virtual switch, including the forwarding of data messages.

Specifically, the link aggregation engine 222 at the Slave Active Supervisor 230 assumes execution of the PAgP for the virtual switch 132. In accordance with the preferred embodiment, the control packet generator 226 at the Slave Active Supervisor 230 begins transmitting newly generated PAgP PDUs 500 from the ports of the virtual switch 132 immediately after detecting the failure, or at least soon thereafter, as indicated at block 432. Due to the failure, however, PAgP PDUs will only be sent from the ports of the Slave Chassis 111, which is now the Active Chassis for the virtual switch 132.

The PAgP PDUs generated by the Slave Chassis 111 also have the same form as the PAgP PDUs 500 previously generated by the Active Chassis 110. As before, the Slave Active Supervisor 230 places the ID assigned to the virtual switch into the Virtual Switch ID field 518 of the PAgP PDUs 500 that it generates, as indicated at block 434. The Slave Active Supervisor 230 also includes an Active Chassis TLV 537 with its PAgP PDUs 500. However, in the Master Chassis ID field 542, the Slave Active Supervisor 230 places the unique ID that was assigned to the Slave Chassis 111, as opposed to the ID assigned to the Active Chassis 110, which had been used in PAgP PDUs 500 prior to the failure, as indicated at block 436.

The PAgP PDUs 500 generated by the Slave Chassis 111 are transmitted from its ports 210 and received by the access switches 105 and 106, as indicated at block 438. As before, the PAgP PDUs 500 are passed to the link aggregation engines 310 of the access switches 105 and 106 for processing. The link aggregation engines 310 detect the new master chassis ID value contained in the received PAgP PDUs 500, and preferably store this new value in memory, as indicated at block 440. The access switches 105 and 106 also generate PAgP PDUs and return them to the virtual switch 132, including transmitting PAgP PDUs to the ports of the Master Chassis 110, as indicated at block 442. The PAgP PDUs generated by the access switches 105 and 106 also include Active Chassis TLVs 537. In these Active Chassis TLVs 537, the access switches 105 and 106 enter the ID for distribution switch 111, i.e., for the ID for the Slave Chassis, into field 542, since this was the value in the PAgP PDUs received from the virtual switch 132, as indicated at block 444. The PAgP PDUs from the access switches 105 and 106 are received at the ports of the virtual switch 132, including the ports of distribution switch 110, which was formerly the Active Chassis.

Figure 4D:
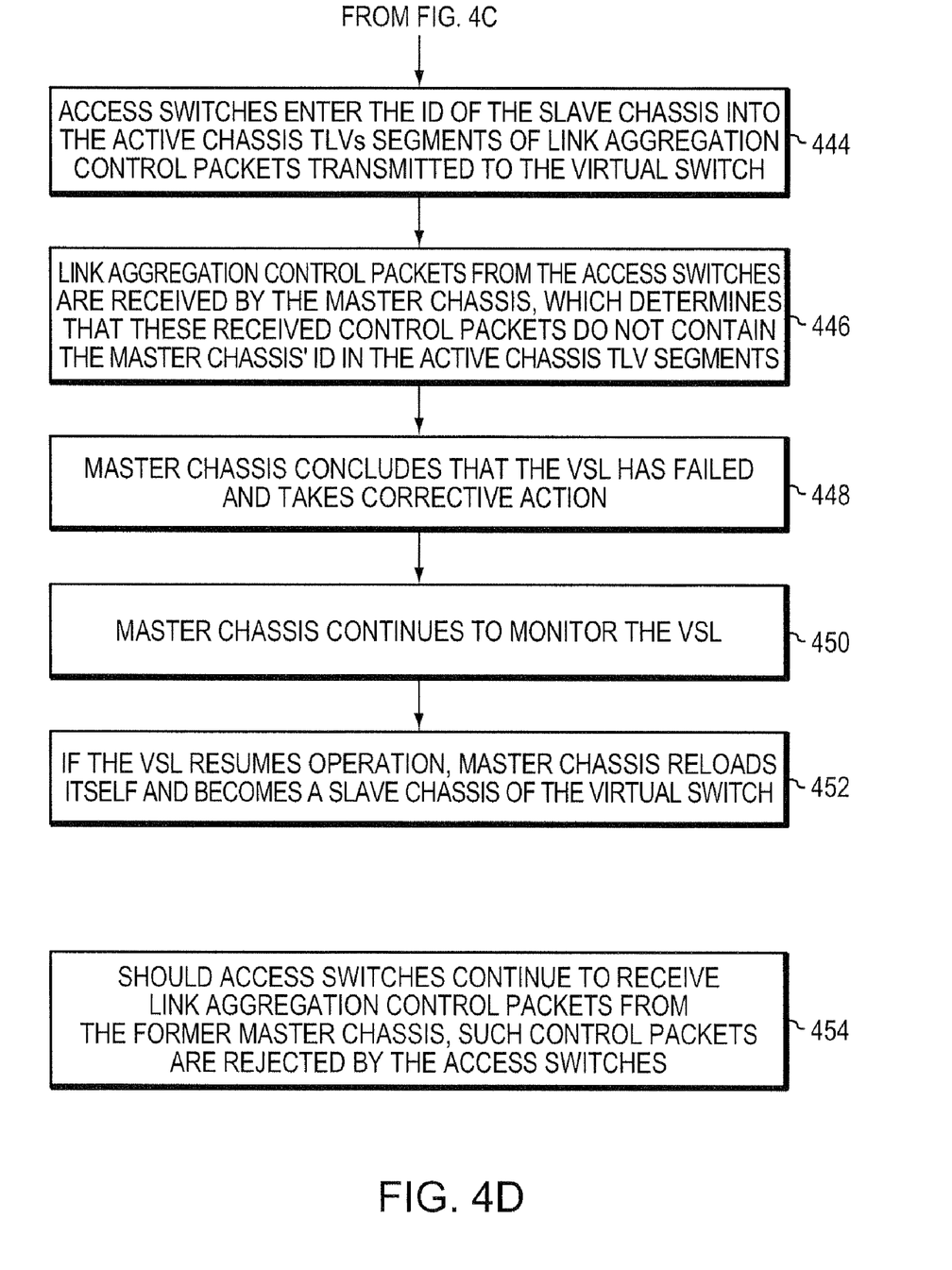

Suppose, however, that distribution switch 110 is still running. The PAgP PDUs received from the access switches 105 and 106 are passed to the active supervisor module 202 of switch 110 for processing. Upon examining these received PAgP PDUs, the link aggregation engine 222 at switch 110 discovers that the Master Chassis ID field 542 does not carry the ID assigned to switch 110, as indicated at block 446. Instead, it carries the ID assigned to switch 111. Switch 110 concludes that the VSL 136 between it and switch 111 has failed. In response, switch 110 preferably takes corrective action, as indicated at block 448. In the illustrative embodiment, this corrective action includes placing all of its ports and interfaces other than the ports and interfaces associated with the VSL 136 in a down state, such that no data traffic is sent or received by switch 110. Switch 110 also stops running all bridging and routing protocols, including PAgP. That is, switch 110 does not send any more PAgP PDUs 500 from its ports 210. Switch 110 does, however, continue to monitor the VSL 136, as indicated at block 450. Should the VSL 136 come back up, switch 110 preferably reloads itself and comes up as the Slave Chassis for the virtual switch 132, as indicated at block 452.

Those skilled in the art will recognize that other corrective actions may be taken.

The access switches 105 and 106 may be configured to continue to accept PAgP PDUs 500 from switch 110, which have the ID for switch 110 in the Master Chassis ID field 542, for a short period of time, e.g., a maximum of about three or so such PAgP PDUs. Thereafter, the access switches 105 and 106 are preferably configured to reject any further PAgP PDUs from switch 110, and to remove the ports on which such PAgP PDUs might continue to be received from the aggregated channel or bundle to the virtual switch 132, as indicated at block 454.

In a second embodiment, the virtual switch 132 and access switches 105 and 106 may utilize a PAgP PDU having an alternative format. In this case, the two switches 110 and 111 that make up the virtual switch are configured with a Domain ID value, and this Domain ID value is carried in the PAgP PDUs.

Figure 6:
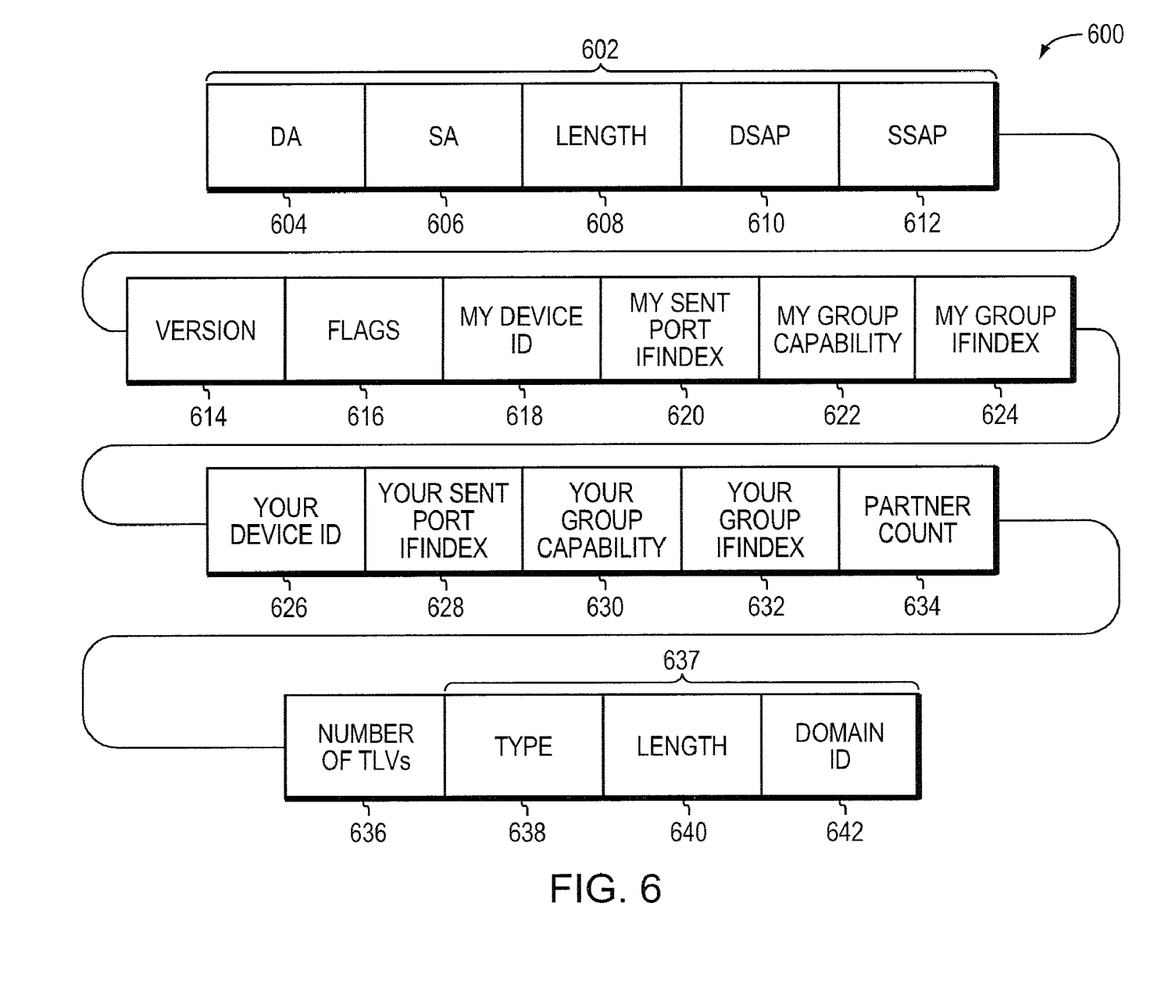

FIG. 6 is a highly schematic illustration of a PAgP PDU 600 according to this second embodiment. The PAgP PDU 600 has a header 602 that includes a DA field 604, an SA field 606, a length field 608, a DSAP field 610, and a SSAP field 612. Following the header is a version field 614, a flags field 616, a My Device ID field 618, a My Sent Port Ifindex field 620, a My Group Capability field 622, and a My Group Ifindex field 624. The PAgP PDU 600 further includes a Your Device ID field 626, a Your Sent Port Ifindex field 628, a Your Group Capability field 630, a Your Group Ifindex field, and a Partner Count field 634. In accordance with this embodiment of the invention, the PAgP PDU 600 further includes a Domain TLV 637. Specifically, the PAgP PDU 600 also includes a Number Of TLVs field 636, which is followed by the Domain TLV 637. The Domain TLV 637, moreover, includes a type field 638, a length field 640, and a Domain ID field 642.

Suppose again that switch 110 is elected the Master Chassis of the virtual switch 132, and that switch 111 becomes the Slave Chassis. The link aggregation engine 222 at the Master Active Supervisor preferably generates PAgP PDUs 600 for transmission from the ports 210 of the virtual switch 132. In the My Device ID field 618, engine 222 loads a unique device ID value assigned to switch 110 that is different from the device ID value assigned to switch 111. In the Domain ID field 642, engine 222 loads the domain value with which the virtual switch 132 has been configured. The PAgP PDUs 600 are then transmitted from the ports 210 of the virtual switch 132 and received by the access switches 105 and 106 where they are processed. In particular, the link aggregation engines 310 at the access switches 105 and 106 preferably store the parameters from the received PAgP PDUs 600 including the device ID value from the My Device ID field 618, and the domain ID value from the Domain ID field 642. The access switches 105 and 106 also generate and return PAgP PDUs to the virtual switch 132, which have the same format as PAgP PDU 600. In the Your Device ID field 626 of these PAgP PDUs 600 being returned to the virtual switch 132, the control packet generator 314 enters the device ID value that was in field 618 of the PAgP PDU 600 received from the virtual switch 132. Similarly, in the Domain ID field 642 of the Domain TLV 637, the control packet generator 314 loads the domain ID value from the PAgP PDU 600 received from the virtual switch 132.

In this way, multiple uplinks 112 between the access switches 105 and 106 and the virtual switch 132 are detected and aggregated into a channel.

If the VSL 136 fails, then switch 111, which is the Slave Chassis, concludes that it should become the Master Chassis as described above. Switch 111 therefore begins running the bridging and routing protocols for the virtual switch 132, including PAgP. Preferably, switch 111 begins generating and transmitting PAgP PDUs 600 from its ports 210. In this case, the control packet generator 226 of engine 222 at switch 111 loads the unique ID for switch 111 into the My Device ID field 618 of the PAgP PDUs 600 to be transmitted from switch 111, as opposed to the device ID for switch 110, which had been used prior to the failure of the VSL 136. In the Domain ID field 642 of the Domain TLV 637, switch 111 loads the common domain ID value assigned to the virtual switch, which is the same value that had been used by switch 110 prior to the VSL 136 failure.

The PAgP PDUs 600 from switch 111 are received and processed by the access switches 105 and 106. Although the domain ID value of these newly received PAgP PDUs 600 is the same as that contained in previously received PAgP PDUs from the virtual switch, the My Device ID value is different. Accordingly, switches 105 and 106 detect the occurrence of a switchover at the virtual switch. Switches 105 and 106 generate PAgP PDUs 600 of their own and transmit them back to the virtual switch 132. Switches 105 and 106 load the Your Device ID field 626 of these PAgP PDUs 600 with the device ID value assigned to switch 111 as contained in the My Device ID field 618 of the received PAgP PDUs 600. In the Domain ID field 642 of the Domain TLV 637, switches 105 and 106 enter the domain ID value assigned to the virtual switch 132 as contained in the PAgP PDUs 600 received from the virtual switch 132. These PAgP PDUs 600 are then transmitted by the access switches 105 and 106, and received and processed by the virtual switch 132. The PAgP PDUs 600 from access switches 105 and 106 are received at the ports of both switch 110 and switch 111. If switch 110 is still functioning, these PAgP PDUs 600 are passed up to the link aggregation engine 222 at switch 110 for processing.

Upon examining the PAgP PDUs 600 from access switches 105 and 106, engine 222 at switch 110 determines that, although these PAgP PDUs carry the domain ID value for virtual switch 132 in the Domain TLV 637, the Your Device ID value from field 626 does not match the device ID of switch 110. Instead, the value in field 626 of these received PAgP PDUs corresponds to the device ID of switch 111. Switch 110 therefore concludes that the VSL 136 must be down, and that switch 111 has taken over the active role for the virtual switch 132. In response to this condition, switch 110 preferably takes corrective action as described above.

The present invention has been described as an extension to PAgP. However, those skilled in the art will understand that the present invention may be used with other protocols besides PAgP. For example, the present invention could be implemented with the Link Aggregation Control Protocol (LACP) described in the Institute of Electrical and Electronics Engineers (IEEE) 802.3ad-2000 standard, which is hereby incorporated by reference in its entirety. The present invention may also be implemented through other protocols, such as link discovery protocols, like the Cisco Discovery Protocol (CDP) from Cisco Systems, Inc., the Spanning Tree Protocol, etc. The present invention could also be implemented through its own independent protocol.

It should be understood that, rather than having the formerly active chassis taking the corrective action, the corrective action may be performed by the chassis that was originally the standby chassis, but which has become the active chassis. For example, the access switches may alternatively be configured to reject PAgP PDUs from switch 111, if the access switches continue to receive PAgP PDUs from switch 110. In this case, switch 111 will detect that its PAgP PDUs are not being accepted, conclude that the VSL must have failed, and take corrective action.

The foregoing description has been directed to specific embodiments of this invention. It will be apparent, however, that other variations and modifications may be made to the described embodiments, with the attainment of some or all of their advantages. For example, the PAgP PDUs of the present invention could employ two TLVs; one identifying the virtual switch, and the other identifying the Master Chassis. Therefore, it is an object of the appended claims to cover all such variations and modifications as come within the true spirit and scope of the invention.

What is claimed is:

1. A virtual switch comprising:
a master switch chassis having a master protocol engine, and a plurality of ports for receiving and forwarding network messages;
a slave switch chassis having a slave protocol engine, and a plurality of ports for receiving and forwarding network messages; and
a communication link coupling the master chassis with the slave chassis such that the master chassis and the slave chassis communicate with each other, wherein
the master protocol engine exchanges a plurality of control packets with a remote switch, at least one of the control packets including a first value identifying the virtual switch, and a second value identifying the master switch chassis,
in response to a failure of the communication link between the master and slave switch chassis, the protocol engine of the slave switch chassis exchanges one or more control packets with the remote switch, the one or more control packets exchanged with the slave switch chassis including the first value identifying the virtual switch, and a third value identifying the slave switch chassis, and
in response to receiving, at the master switch chassis, a control packet from the remote switch that includes the first value identifying the virtual switch and the third value identifying the slave switch chassis, the master switch chassis concludes that there has been a failure of the communication link between the master and slave switch chassis, and either the master switch chassis or the slave switch chassis executes a corrective action that is responsive to the failure of the communication link.

2. The virtual switch of claim 1 wherein
the virtual switch is connected to the remote switch by a plurality of uplinks, and
the master protocol engine includes a link aggregation engine configured to aggregate two or more of the uplinks into a channel.

3. The virtual switch of claim 1 wherein
the master and slave switch chassis communicate across the communication link so as to elect the master switch chassis as the master of the virtual switch, and
the slave switch chassis operates under control of the master switch chassis.

4. The virtual switch of claim 2 wherein
the control packets are link aggregation protocol data units (PDUs),
the first value is an identifier assigned to the virtual switch,
the second value is an identifier assigned to the master switch chassis, and
the third value is an identifier assigned to the slave switch chassis.

5. The virtual switch of claim 1 wherein the corrective action is executed by the master switch chassis.

6. The virtual switch of claim 5 wherein the corrective action executed by the master switch chassis includes preventing the ports of the master switch chassis from receiving and sending data packets.

7. The virtual switch of claim 2 wherein the link aggregation engine is configured to execute one of the Port Aggregation Protocol (PAgP) and the Institute of Electrical and Electronics Engineers (IEEE) 802.1ad link aggregation specification standard.

8. The virtual switch of claim 1 wherein the control packets from the master protocol engine are transmitted from the ports of the master switch chassis and from the ports of the slave switch chassis.

9. A method for responding to a failure of a communication link between a master switch chassis and a slave switch chassis configured and arranged to operate as a single virtual switch, the master switch chassis and the slave switch chassis each having a plurality of ports for exchanging network messages with a remote switch, the method comprising:
generating a plurality of control packets at the master switch chassis, the plurality of control packets including a first value identifying the virtual switch, and a second value identifying the master switch chassis;
transmitting the plurality of control packets to the remote switch from the ports of the master switch chassis and the slave switch chassis;
in response to a failure of the communication link, generating a plurality of control packets at the slave switch chassis, the plurality of control packets including the first value identifying the virtual switch, and a third value identifying the slave switch chassis;
transmitting the plurality of control packets generated by the slave switch chassis from the ports of the slave switch chassis to the remote switch;
receiving at the master switch chassis at least one control packet from the remote switch, the at least one received control packet including the first value identifying the virtual switch and the third value identifying the slave switch chassis;
in response to receiving at the master switch chassis the at least one control packet from the remote switch, concluding, at the master switch chassis, that there has been a failure of the communication link between the master switch chassis and the slave switch chassis; and
executing, by either the master switch chassis or the slave switch chassis, a corrective action responsive to the failure of the communication link.

10. The method of claim 9 wherein the executing the corrective action is performed by the master switch chassis, and includes blocking the ports of the master switch chassis from both receiving and sending data messages.

11. The method of claim 9 wherein the control packets generated by the master switch chassis are transmitted from the ports of the master switch chassis and the ports of the slave switch chassis.

12. The method of claim 11 wherein the executing the corrective action is performed by the master switch chassis, and includes blocking the ports of the master switch chassis from both receiving and sending data messages.

13. The method of claim 9 wherein the control packets correspond to a link aggregation protocol executed by the virtual switch and the remote switch.

14. The method of claim 13 wherein
the control packets generated by the master switch chassis are link aggregation protocol messages,
the link aggregation protocol messages have a My Device Identifier field, and
the first value identifying the virtual switch is entered in the My Device Identifier field.

15. The method of claim 14 wherein
the link aggregation protocol messages have a type-length-value area, and the second value identifying the master switch chassis is entered in the type-length-value area.

16. The method of claim 15 wherein
the control packets generated by the slave switch chassis are link aggregation protocol messages,
the link aggregation protocol messages generated by the slave switch chassis have a My Device Identifier field, and a type-length-value area, and
the slave switch chassis enters the first value identifying the virtual switch in the My Device Identifier field, and the third value identifying the slave switch chassis in the type-length-value field.

17. The method of claim 13 wherein
the control packets generated by the master switch chassis are link aggregation protocol messages,
the link aggregation protocol messages have a type-length-value area, and
the first value identifying the virtual switch is a domain identifier that is entered in the type-length-value area.

18. A remote switch for detecting a failure of a communication link between a master switch chassis and a slave switch chassis configured and arranged to operate as a single virtual switch, the master switch chassis and the slave switch chassis each having a plurality of ports for exchanging network messages with the remote switch, the remote switch comprising:
a plurality of ports for receiving control messages from the virtual switch and for sending control messages to the virtual switch; and
a protocol engine for processing the control messages received from the virtual switch and for generating the control messages being sent to the virtual switch, wherein the protocol engine is configured and arranged to
(a) in response to receiving from both the master switch chassis and the slave switch chassis of the virtual switch a plurality of control messages including a first value identifying the virtual switch and a second value identifying the master switch chassis, send a plurality of control messages to the virtual switch that include the first value and the second value, and
(b) in response to receiving from the slave switch chassis one or more control messages including the first value identifying the virtual switch and a third value identifying the slave switch chassis, send one or more control messages to the master switch chassis that include the first value and the third value to cause the master switch chassis to conclude that there has been a failure of the communication link between the master switch chassis and the slave switch chassis.

19. The remote switch of claim 18 wherein
the protocol engine is configured to execute a link aggregation protocol, and
the control messages are link aggregation protocol data units (PDUs).

20. The remote switch of claim 19 wherein the protocol engine is further configured to include a master chassis type-length-value segment that identifies the master switch chassis within the link aggregation PDUs.

21. The remote switch of claim 20 wherein the link aggregation protocol executed by the protocol engine is one of the Port Aggregation Protocol (PAgP) and the Institute of Electrical and Electronics Engineers (IEEE) 802.1ad link aggregation specification standard.

22. A master switch chassis of a virtual switch, comprising:
a plurality of ports configured to receive and forward network messages, the plurality of ports including a first port coupled to a communication link to a slave switch chassis, the communication link, when operational, to enable the master switch chassis and the slave switch chassis to communicate with each other, the plurality of ports further including a second port coupled to an uplink to a remote switch; and
a master protocol engine configured to exchange a plurality of control packets with the remote switch, at least one of the control packets including a first value identifying the virtual switch, and a second value identifying the master switch chassis, the master protocol engine further configured to receive a plurality of control packet from the remote switch, and in response to receipt of a control packet from the remote switch that includes the first value identifying the virtual switch and a third value identifying the slave switch chassis, to conclude that there has been a failure of the communication link between the master and slave switch chassis and to execute a corrective action.

23. The master switch chassis of claim 22 wherein the corrective action includes preventing ports of the master switch chassis from receiving and sending data packets.

24. The master switch chassis of claim 22 wherein
the control packets are link aggregation protocol data units (PDUs),
the first value is an identifier assigned to the virtual switch,
the second value is an identifier assigned to the master switch chassis, and
the third value is an identifier assigned to the slave switch chassis.

25. The master switch chassis of claim 22 wherein the master protocol engine includes a link aggregation engine configured to aggregate two or more uplinks to the remote switch into a channel.

26. The master switch chassis of claim 25 wherein the link aggregation engine is configured to execute one of the Port Aggregation Protocol (PAgP) and the Institute of Electrical and Electronics Engineers (IEEE) 802.1ad link aggregation specification standard.

* * * * *

UNITED STATES PATENT AND TRADEMARK OFFICE
CERTIFICATE OF CORRECTION

PATENT NO.       : 7,639,605 B2                                          Page 1 of 1
APPLICATION NO.  : 11/350231
DATED            : December 29, 2009
INVENTOR(S)      : Narayanan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this

Twenty-first Day of December, 2010

David J. Kappos
*Director of the United States Patent and Trademark Office*